(12) United States Patent
Winston

(10) Patent No.: US 7,412,976 B2
(45) Date of Patent: Aug. 19, 2008

(54) SOLAR COLLECTORS WITH EVACUATED RECEIVER AND NONIMAGING EXTERNAL REFLECTORS

(75) Inventor: Roland Winston, Merced, CA (US)

(73) Assignee: Solargenix Energy LLC, Sanford, NC (US)

( * ) Notice: Subject to any disclaimer, the term of this patent is extended or adjusted under 35 U.S.C. 154(b) by 646 days.

(21) Appl. No.: 10/829,700

(22) Filed: Apr. 22, 2004

(65) Prior Publication Data

US 2004/0261788 A1    Dec. 30, 2004

Related U.S. Application Data

(60) Provisional application No. 60/464,429, filed on Apr. 22, 2003.

(51) Int. Cl.
*F24J 2/50* (2006.01)
*F24J 2/32* (2006.01)
*F24J 2/12* (2006.01)

(52) U.S. Cl. ................ 126/684; 126/658; 126/652; 126/635; 126/657

(58) Field of Classification Search ............... 126/684, 126/658, 652, 635, 657
See application file for complete search history.

(56) References Cited

U.S. PATENT DOCUMENTS

| | | | | | |
|---|---|---|---|---|---|
| 4,091,796 | A | * | 5/1978 | Bieringer et al. | 126/657 |
| 4,286,580 | A | * | 9/1981 | Sitnam | 126/657 |
| 4,303,059 | A | * | 12/1981 | Ford | 126/655 |
| 4,392,007 | A | * | 7/1983 | Barkats et al. | 136/248 |
| 5,154,163 | A | * | 10/1992 | Rabl | 126/690 |
| 5,465,708 | A | * | 11/1995 | Goebel et al. | 126/635 |
| 6,244,264 | B1 | * | 6/2001 | Winston | 126/652 |

FOREIGN PATENT DOCUMENTS

DE         30 25 826 A1 *   1/1981

* cited by examiner

*Primary Examiner*—Steven B. McAllister
*Assistant Examiner*—Sarah Suereth
(74) *Attorney, Agent, or Firm*—Foley & Lardner LLP

(57) ABSTRACT

A solar collector with external reflector. A solar collector includes a glass housing having a heat pipe disposed within the housing and a light reflector disposed external to the housing.

10 Claims, 12 Drawing Sheets

Measurement with Wind (acc. to ISO, DIN, EN)

| Reference Area | Absorber | Aperture | Gross |
|---|---|---|---|
| $\eta_0$ (-) | 0.617 | 0.624 | 0.543 |
| $a_1$ (W/m²K) | 1.07 | 1.08 | 0.94 |
| $a_2$ (W/m²K²) | 0.0013 | 0.0013 | 0.0011 |

$\eta(T°_m) = \eta_0 - a_1 T°_m - a_2 G T°_m{}^2$ [$T°_m = (t_m - t_a)/G$]

$t_m$: Avg. Fluid Temp, $t_a$: Ambient Temperature, G: Irradiance

Measurement without Wind (acc. to SPF)

| Reference Area | Absorber | Aperture | Gross |
|---|---|---|---|
| $C_0$ (-) | 0.617 | 0.624 | 0.543 |
| $C_1$ (W/m$^2$K) | 1.04 | 1.05 | 0.91 |
| $C_2$ (W/m$^2$K$^2$) | 0.0013 | 0.0013 | 0.0011 |

$\eta(X) = C_0 - C_1 X - C_2 G X^2$ [$X = (t_m - t_a)/G$]

$t_m$: Avg. Fluid Temp, $t_a$: Ambient Temperature, G: Irradiance

Measurement with Wind (acc. to ISO, DIN, EN)

| Reference Area | Absorber | Aperture | Gross |
|---|---|---|---|
| $\eta_0$ (-) | 0.726 | 0.655 | 0.545 |
| $a_1$ (W/m²K) | 1.40 | 1.26 | 1.05 |
| $a_2$ (W/m²K²) | 0.0000 | 0.0000 | 0.0000 |

$\eta(T°_m) = \eta_0 - a_1 T°_m - a_2 G T°_m{}^2$ [$T°_m = (t_m - t_a)/G$]

$t_m$: Avg. Fluid Temp, $t_a$: Ambient Temperature, G: Irradiance

Measurement without Wind (acc. to SPF)

| Reference Area | Absorber | Aperture | Gross |
|---|---|---|---|
| $C_0$ (-) | 0.726 | 0.655 | 0.545 |
| $C_1$ (W/m$^2$K) | 1.14 | 1.03 | 0.86 |
| $C_2$ (W/m$^2$K$^2$) | 0.0000 | 0.0000 | 0.0000 |

$\eta(X) = C_0 - C_1 X - C_2 G X^2$ [$X = (t_m - t_a)/G$]

$t_m$: Avg. Fluid Temp, $t_a$: Ambient Temperature, G: Irradiance

Measurement with Wind (acc. to ISO, DIN, EN)

| Reference Area | Absorber | Aperture | Gross |
|---|---|---|---|
| $\eta_0$ (-) | 0.675 | 0.677 | 0.601 |
| $a_1$ (W/m²K) | 1.56 | 1.56 | 1.39 |
| $a_2$ (W/m²K²) | 0.0019 | 0.0019 | 0.0017 |

$\eta(T°_m) = \eta_0 - a_1 T°_m - a_2 G T°_m{}^2 \; [T°_m = (t_m - t_a)/G]$ $t_m$: Avg. Fluid Temp, $t_a$: Ambient Temperature, G: Irradiance

Measurement without Wind (acc. to SPF)

| Reference Area | Absorber | Aperture | Gross |
|---|---|---|---|
| $C_0$ (-) | 0.675 | 0.677 | 0.601 |
| $C_1$ (W/m²K) | 1.40 | 1.40 | 1.25 |
| $C_2$ (W/m²K²) | 0.0019 | 0.0019 | 0.0017 |

$\eta(X) = C_0 - C_1 X - C_2 G X^2$ [$X = (t_m - t_a)/G$]

$t_m$: Avg. Fluid Temp, $t_a$: Ambient Temperature, G: Irradiance

SOLAR COLLECTORS WITH EVACUATED RECEIVER AND NONIMAGING EXTERNAL REFLECTORS The invention is directed to a collector having an externally disposed nonimaging reflector and more particularly is directed to a solar collector with a heat pipe positioned within an evacuated glass tube with an externally disposed nonimaging reflector.

BACKGROUND OF THE INVENTION

It was recognized more than 20 years ago, that combining selective absorbers, vacuum insulation and nonimaging concentration (using Compound Parabolic Concentrator, or "CPC", type optics as shown in FIG. 9A-9C) enabled stationary mid-temperature collectors to have a useful operating range approaching 300 degrees Celsius". Following the early proof-of-concept experiments, a commercial collector was developed in the last 5-years with good performance up to 250 degrees Celsius. These configurations integrated all the optics within the vacuum envelope. For this reason we refer to them as ICPC's (integrated CPC's). Their cost of manufacture is presently too high for widespread applications. On the other hand, the advent of very low-cost evacuated tubes allows us now to consider these as candidates for low-cost mid-temperature applications. One can combine various of these features to use such low-cost tubes (intended as stand-alone low-temperature collectors for providing domestic hot water) as receivers and now combined with external nonimaging reflectors. Since these glass tubes were originally intended for low-temperature (domestic hot water) use, their use at higher temperatures raised issues such as providing for efficient heat transfer to a working fluid, and assuring against thermal-induced tube breakage.

A solar collector which is efficient at temperatures in the 125 to 150 degree Celsius above ambient range would therefore be of great utility for many high-value applications. For example, operating temperatures for solar cooling in conjunction with double-effect chillers are in this range. At the same time the collector component would need to be low-cost, have minimal operation and maintenance cost and long life. The external reflector form of a CPC has the potential for satisfying these criteria. The vacuum receiver has intrinsically long-life, being protected from the environment. The impressive commercial development of vacuum solar collectors in China over the last decade and more demonstrates that these can be manufactured and sold at low-cost. To give an example; in the year 2000 the all-glass dewar type solar tube made in China was available at an OEM cost of $3 US. Since the volume of manufacturing has been rising, prices are not increasing. It is significant to observe that a wide-angle CPC reflector will "unwrap" the cylindrical solar tube to an aperture of approximately 0.2 square meters. Therefore the vacuum component contributes $15 per square meter to the cost. The heat extraction device which may be a manifold likely adds a similar amount. The nonimaging reflector can be estimated at $20 per square meter, which is dominated by the material cost for a high quality aluminum mirror. An installed cost of approximately $100 per square meter would be a reasonable goal. The availability of an efficient mid-temperature solar collector for $100 per square meter would have a broad vista of applications.

SUMMARY OF THE INVENTION

A solar collector system is directed to a combination of a heat pipe disposed within a housing which is at least partially transparent to light with the housing preferably evacuated. The heat pipe includes a copper pipe and coupled aluminum heat transfer fins disposed about the heat pipe. The fins are molded to optimize thermal contact with the heat pipe and interior surface of the housing. The solar collector further includes a reflector assembly externally disposed to the housing to simplify construction and costs of manufacture. Preferably the reflector is a nonimaging design.

DESCRIPTION OF PREFERRED EMBODIMENTS

Figure 1:
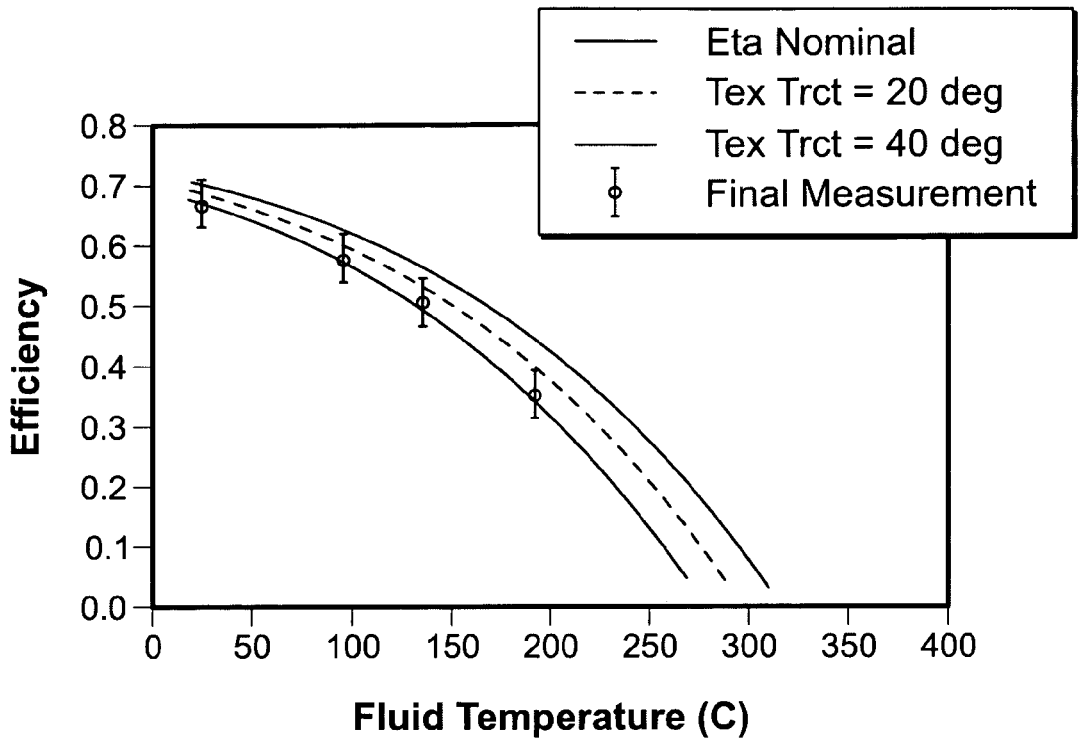
FIG. 1 shows XCPC thermal model performance and measured performance of a test panel with dewar tubes.
Figure 2:
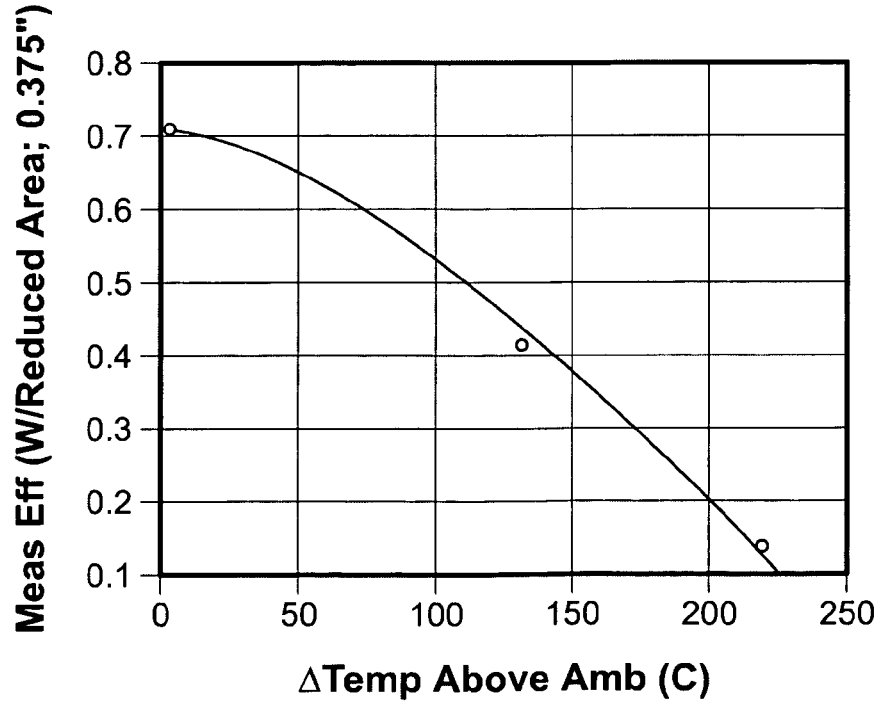
FIG. 2 shows instantaneous solar to thermal conversion efficiency for a heat pipe embodiment for mid temperature performance ranges.
Figure 3:
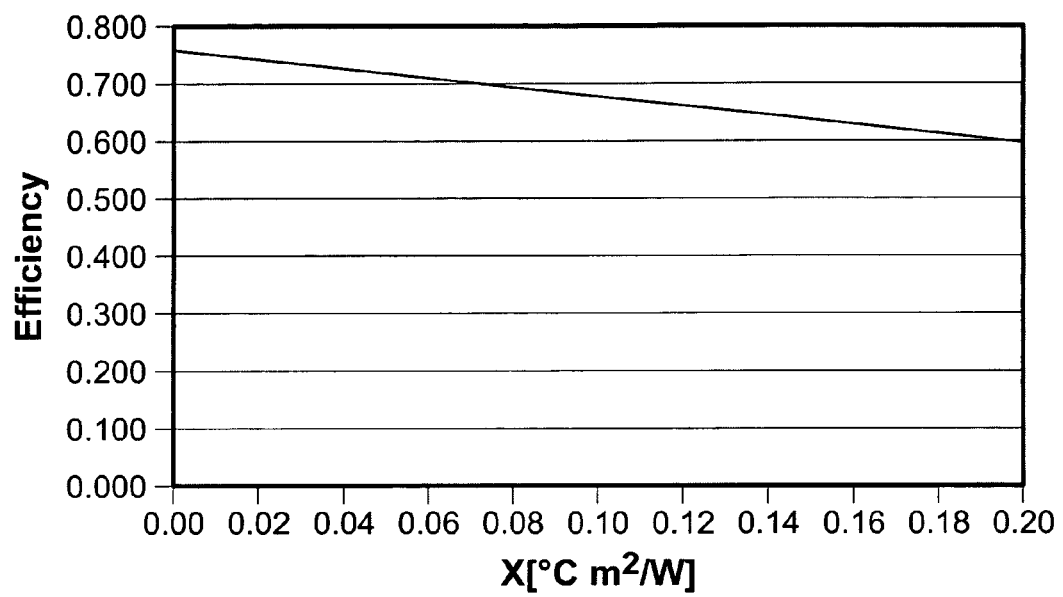
FIG. 3 shows performance limits of a commercial VAC 2000 solar collector.
Figure 4A:
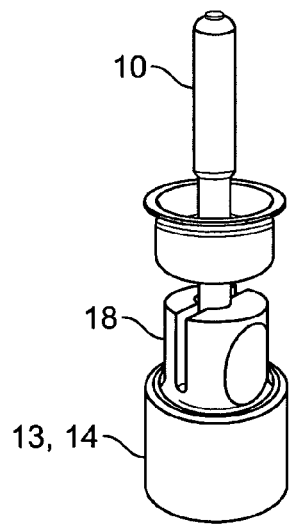
FIG. 4A shows a disassembled embodiment of a portion of a solar receiver and FIG. 4B shows a cross section of an assembled unit.
Figure 4B:
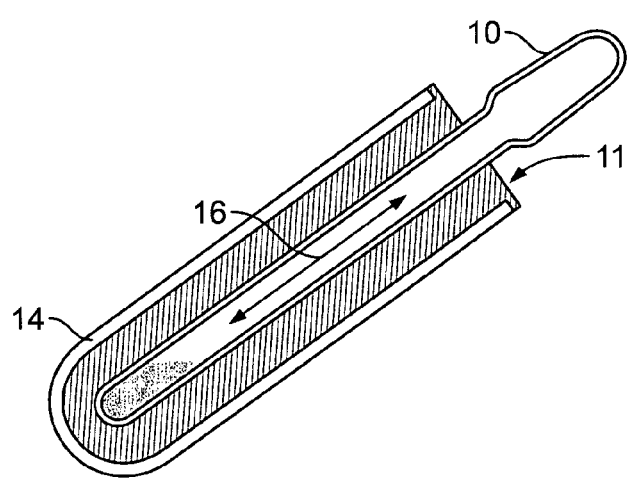
Figure 5:
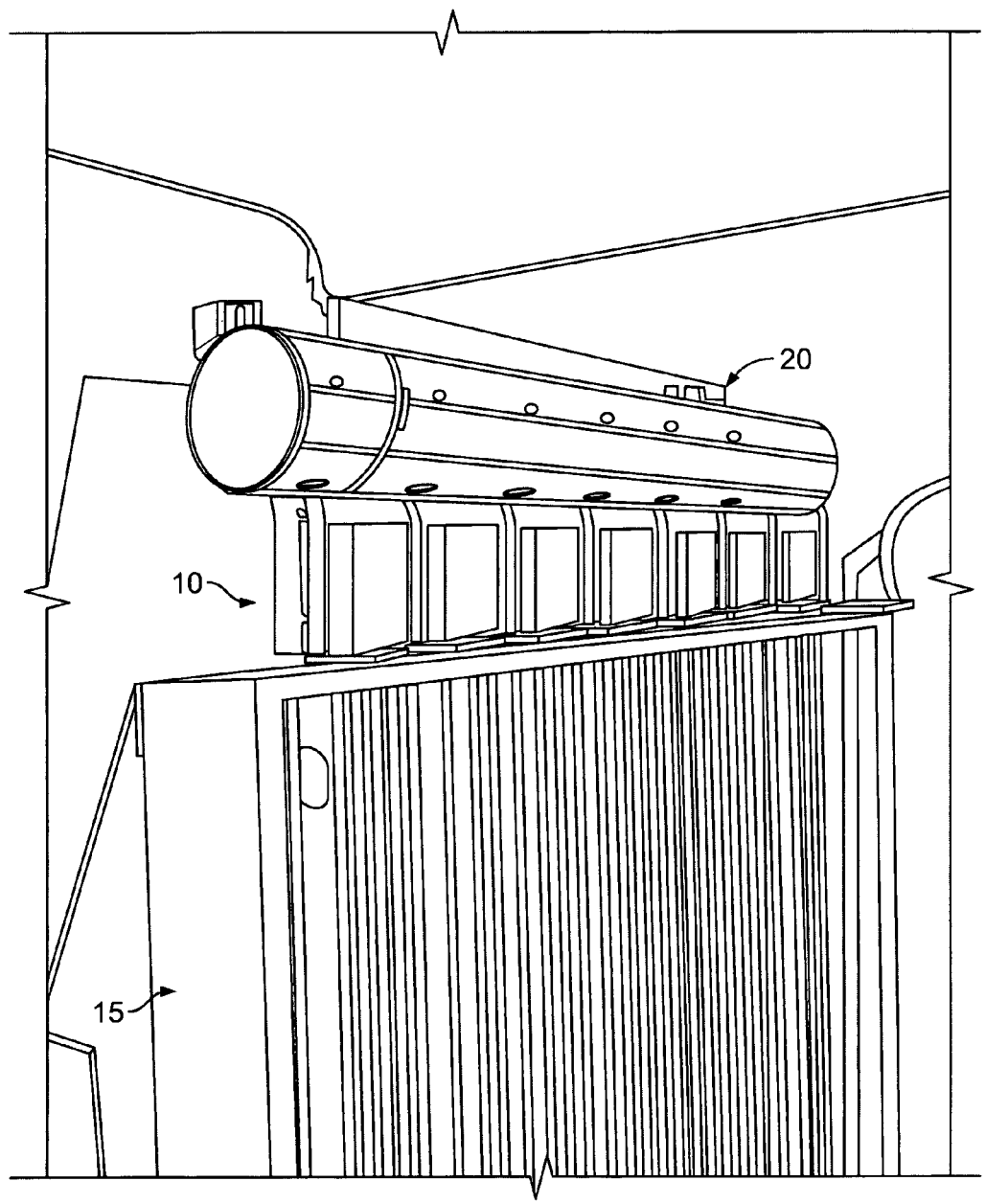
FIG. 5 shows a partially assembled collector system with the manifold and heat pipe in position.
Figure 6:
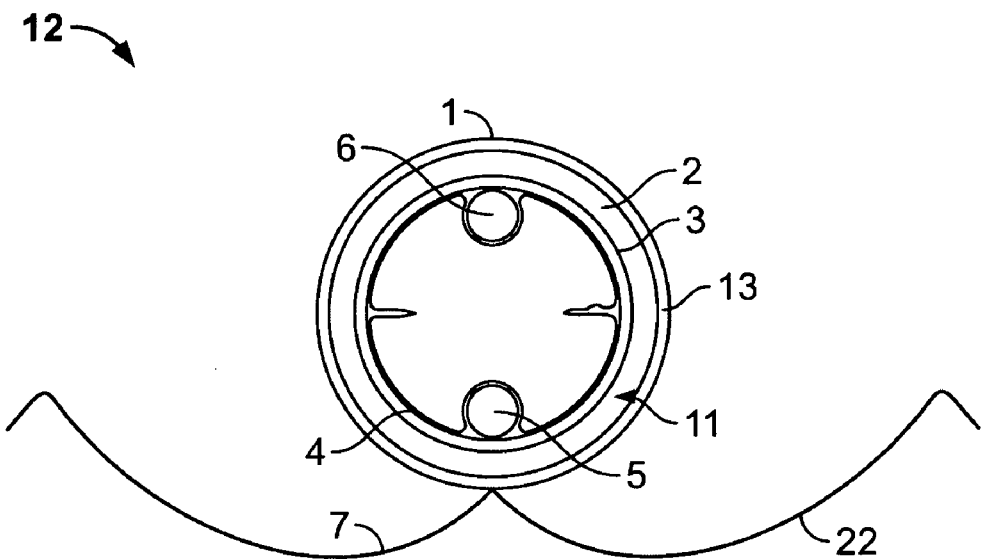
FIG. 6 shows a first collector configuration with external reflector.
Figure 7:
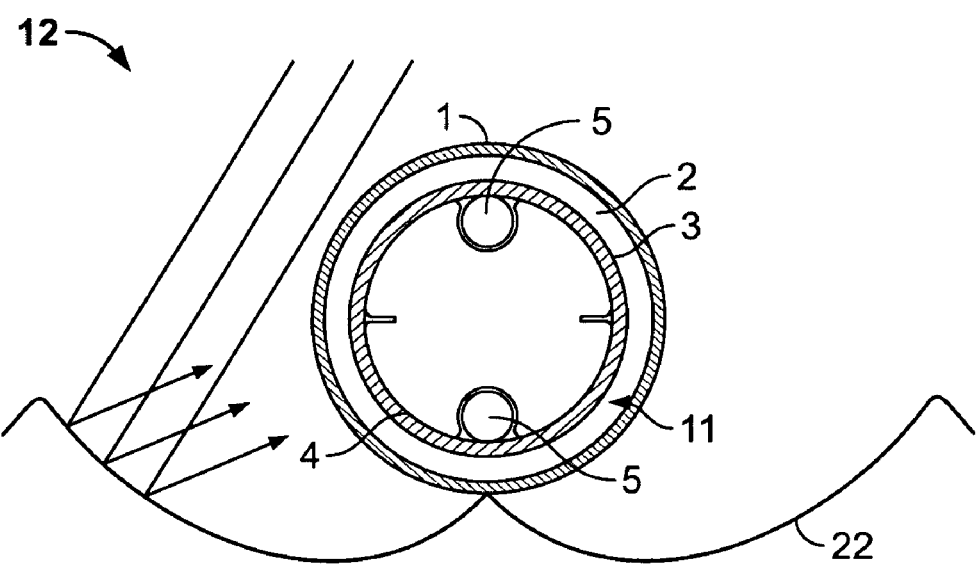
FIG. 7 shows a second collector configuration with external reflector.
Figure 8:
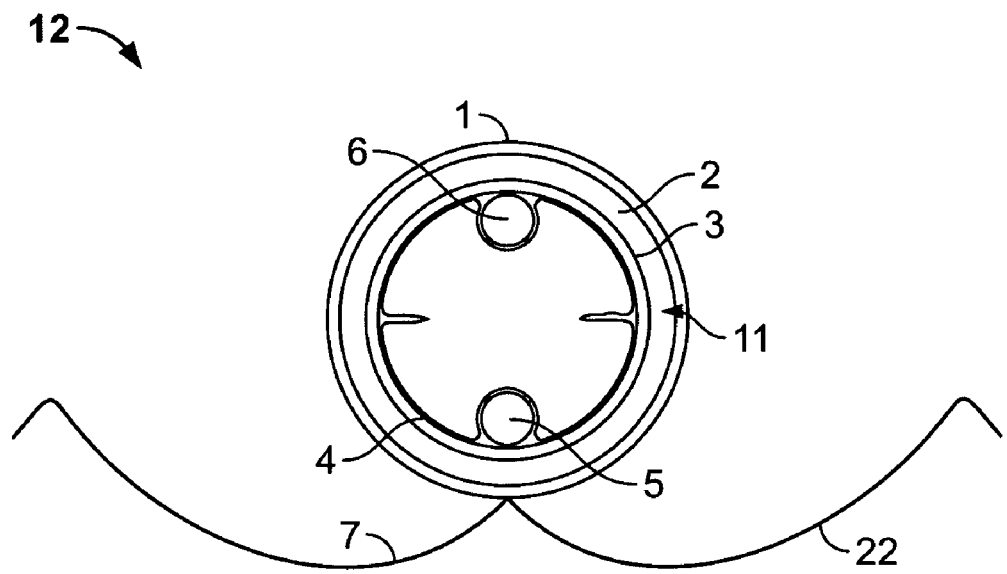
FIG. 8 shows a third collector configuration with external reflector.
Figure 9A:
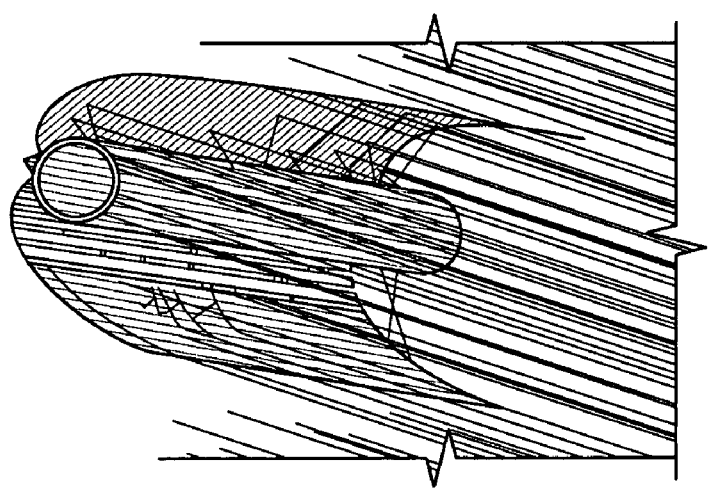
FIG. 9A shows a CPC shape for various incidence angles.
Figure 9B:
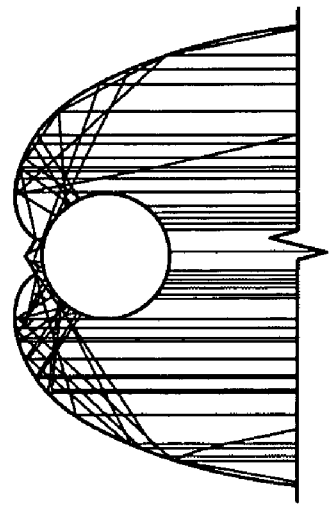
FIG. 9B shows 0° (normal) incidence and FIG. 9C SHOWS 30° incidence.
Figure 9C:
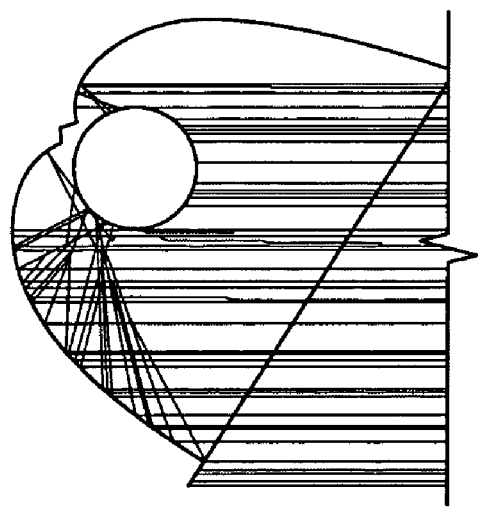

In accordance with the invention, two types of preferred combination of solar collectors 12 (concentrators or receivers) are described, including an all glass dewar-type tube 11 and a heat-pipe 10 in a conventional evacuated tube 13 (see FIGS. 4A, 4B and 5). The dewar-type 11 is very low-cost since it is made in large quantities by a large number of manufacturers and uses a very low-cost borosilicate glass tubing. Good heat transfer poses technical challenges, and our experiments with a heat transfer compound to couple the tube 11 to a manifold 20 gave encouraging results. The preliminary mid-temperature performance obtained with a test panel with dewar tubes is compared with that predicted by a simple model shown in FIG. 1. The heat-pipe evacuated tube 13 (see FIG. 4B), uses the same very low-cost glass tubing. The heat transfer is accomplished in an elegant way by the incorporation of the heat pipe 10 within the evacuated tube 13 which in turn is disposed in a full panel array 15 (see FIGS. 4A, 4B and 5). The heat pipe 10 of FIGS. 4A and 4B includes a copper heat pipe 16 and contoured aluminum heat transfer fins 18 with the heat pipe 10 inserted into the glass tube 14 sandwiched between two aluminum fins 18. The fins 18 are molded to maximize contact with the heat pipe 10 and the inside surface of the evacuated glass tube 14. The heat pipe 10 transfers heat to the manifold 20 shown in FIG. 5 via heat transfer liquid inside the hollow heat pipe 10. The hollow centre of the heat pipe 10 includes a vacuum, so that at even at temperatures of around 25-30° C. the well known heat transfer compound will vaporize. When heated the vapor rises to the tip (condenser) of the heat pipe 10 where the heat is transferred to the water flowing through the manifold 20. The loss of heat causes the vapor to condense and flow back down the heat pipe 10 where the process is once again repeated. The preliminary mid-temperature performance obtained with the prototype heat-pipe version is shown in FIG. 2. The performance limit of known CPC-type vacuum solar collectors (not shown) can be gauged from FIG. 3. In this type of solar device both absorber and nonimaging concentrating optics are encased in an integral glass envelope, and this is called the integrated CPC or I CPC. Commercial collectors of this type have a higher cost than the all glass dewar type with external CPC reflectors 22 of FIGS. 6-8. However, it does indicate a practical and realizable performance upper limit for the stationary nonimaging solar collectors 12. One can further combine the advantages of the low-cost all-glass evacuated receiver with the heat pipe. As shown in FIGS. 4A, 4B and 5, the heat pipe 10 and absorber fin assembly is inserted in the double-walled evacuated tube 14 and the heat pipes 10 are inserted into the simple flow-through heat exchanger manifold 20. There is no fluid connection which is one of the chief advantages of a heat application, but appears sufficiently robust to withstand stagnation temperatures. Various examples of performance of a conventional evacuated tube but externally disposed reflector (without the heat pipe 10) are shown in Examples I-III wherein collector test results are shown in FIGS. 6-8 for the collector configurations. These tests were made by Solartechnik Prüfung Forschung, located in Bern, Switzerland.

While preferred embodiments have been illustrated and described, it should be understood that changes and modifications can be made therein in accordance with one of ordinary skill in the art without departing from the invention in its broader aspects.

EXAMPLES

The following non-limiting examples describe various embodiments and associated performance test results.

Example I

Figure 10A:
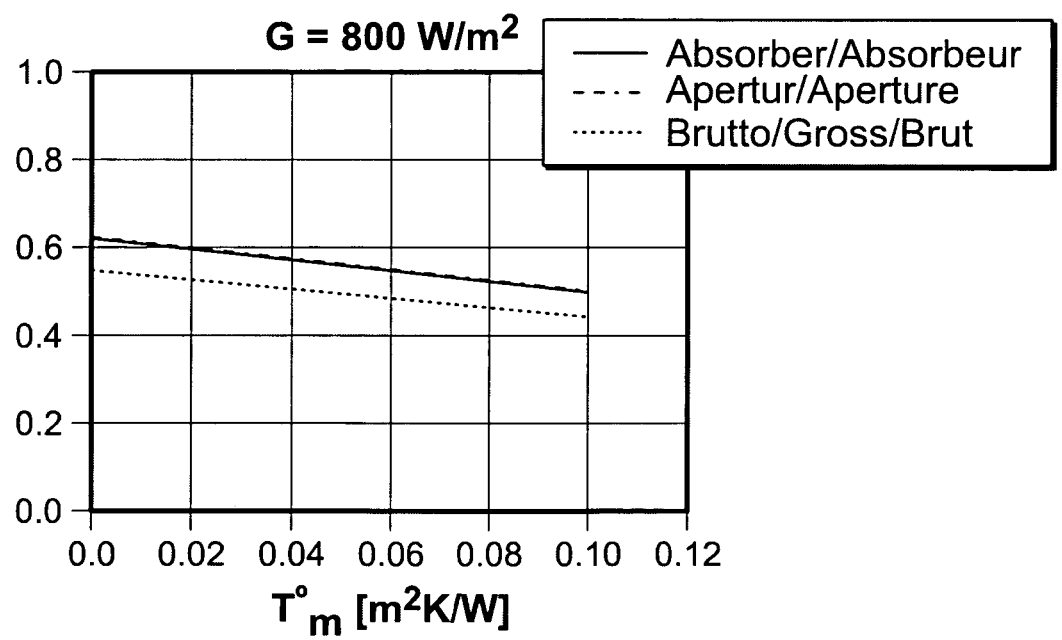
FIG. 10A shows a plot of thermal performance of collector test number C444 with wind.
Figure 10B:
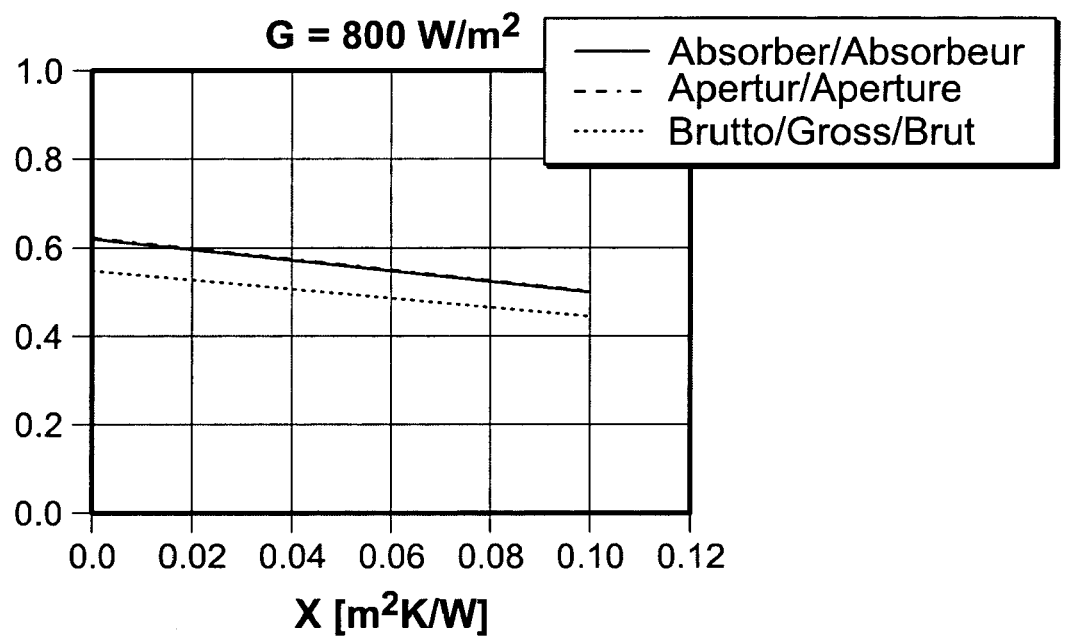
FIG. 10B shows the performance without wind.

Collector Test No. C444. The embodiment of FIG. 6 is described in Table 1 and was subjected to various tests as set forth in Table 2. Note there was no stagnation temperature for standard values ISO 9806-2 and EN 12975-2 are 30° C./1000 W/m². The thermal performance (flowrate at test: 204 l/h) is shown in FIGS. 10A and 10B, with and without wind, respectively.

TABLE 1

| | |
|---|---|
| Contact | Ritter Solar GmbH, D-72135 Dettenhausen |
| | Tel. +49 (07157) 5359-0, |
| | Fax +49 (07157) 5359-20 |
| Distributed in* | DE |
| Type | ETC, cylindrical absorbers, CPC, direct heat transfer |
| Assembly | |
| Installation* | Installation on sloping roof, Flat roof with support |
| Rated flowrate* | 180 l/h |
| Absorber coating* | Al/Al N |
| Dimensions (absorber, aperture, gross) | 2.010 m², 1.988 m², 2286 m² |
| Gross dimensions: l, w, h (in m) | 1.640 × 1.394 × 0.105 |
| Weight including glazing* | 35 kg |

*= manufacturer information

TABLE 2

| Test | Carried out | Section | Report* |
|---|---|---|---|
| Durability test according to ISO | No | 3 | LTS C444 |
| Durability test according to EN | No | 3 | C444LPEN |
| Measurement of stagnation temperature | No | 3.1 | |
| Efficiency measurement acc. SPF | Yes | 4.1 | |
| Efficiency measurement acc ISO, DIN, EN | Yes | 4.1 | |
| Incidence angle modifier (IAM) | Yes | 4.4 | |
| Measurement of pressure drop | No | 4.5 | |
| Measurement of thermal capacity | Yes | 4.6 | |
| Measurement of time constant | Yes | 4.6 | |

*= contact manufacturer for details!

Tables 3A and 3B illustrate characteristic efficiency values (normal incidence, G=800 W/m²) for efficiency with and without wind, respectively. Tables 4A and 4B show power output (power in watts per collector, normal incidence, beam irradiation) with and without wind, respectively.

TABLES 3A and 3B

| Reference area | Absorber | Aperture | Gross | Reference area | Absorber | Aperture | Gross |
|---|---|---|---|---|---|---|---|
| $\eta\ (T^*_m = 0.00)$ | 0.62 | 0.62 | 0.54 | $\eta\ (x = 0.00)$ | 0.62 | 0.62 | 0.54 |
| $\eta\ (T^*_m = 0.05)$ | 0.56 | 0.57 | 0.49 | $\eta\ (x = 0.05)$ | 0.56 | 0.57 | 0.50 |
| $\eta\ (T^*_m = 0.10)$ | 0.50 | 0.51 | 0.44 | $\eta\ (x = 0.10)$ | 0.50 | 0.51 | 0.44 |

TABLES 4A and 4B

| Irradiation | 400 W/m² | 700 W/m² | 1000 W/m² | Irradiation | 400 W/m² | 700 W/m² | 1000 W/m² |
|---|---|---|---|---|---|---|---|
| $t_m - t_e = 10K$ | 474 | 846 | 1'218 | $t_m - t_e = 10K$ | 475 | 847 | 1'219 |
| $t_m - t_e = 30K$ | 429 | 801 | 1'173 | $t_m - t_e = 30K$ | 431 | 803 | 1'175 |
| $t_m - t_e = 50K$ | 382 | 754 | 1'126 | $t_m - t_e = 50K$ | 385 | 757 | 1'129 |

Table 5 shows incidence angle modifier (IAM), Table 6 shows pressure drop in Pascals (test fluid 33.3% Ethylenglykol) and Table 7 shows thermal capacity and time constant.

TABLE 5

|  | 0° | 10° | 20° | 30° | 40° | 50° | 60° | 70° | 80° | 90° |
|---|---|---|---|---|---|---|---|---|---|---|
| $K(\Theta)_{,long}$ | 1.0 | | | | | 0.90 | | | | 0.0 |
| $K(\Theta)_{,trans}$ | 1.0 | | 1.01 | 1.0 | 1.01 | 1.01 | 1.05 | 1.16 | | 0.0 |

TABLE 6

|  | 100 l/h | 150 l/h | 250 l/h | 350 l/h | 500 l/h |
|---|---|---|---|---|---|
| 20° C. | | | | | |
| 60° C. | | | | | |
| 80° C. | | | | | |

TABLE 7

| Thermal capacity (kJ/K) | Time constant (s) |
|---|---|
| 16.2 | 202 |

These tests were performed by SPF, Hochschule Rapperswil (HSR) at Oberseestr. 10, CH-8640 Rapperswil.

Example II

Figure 11A:
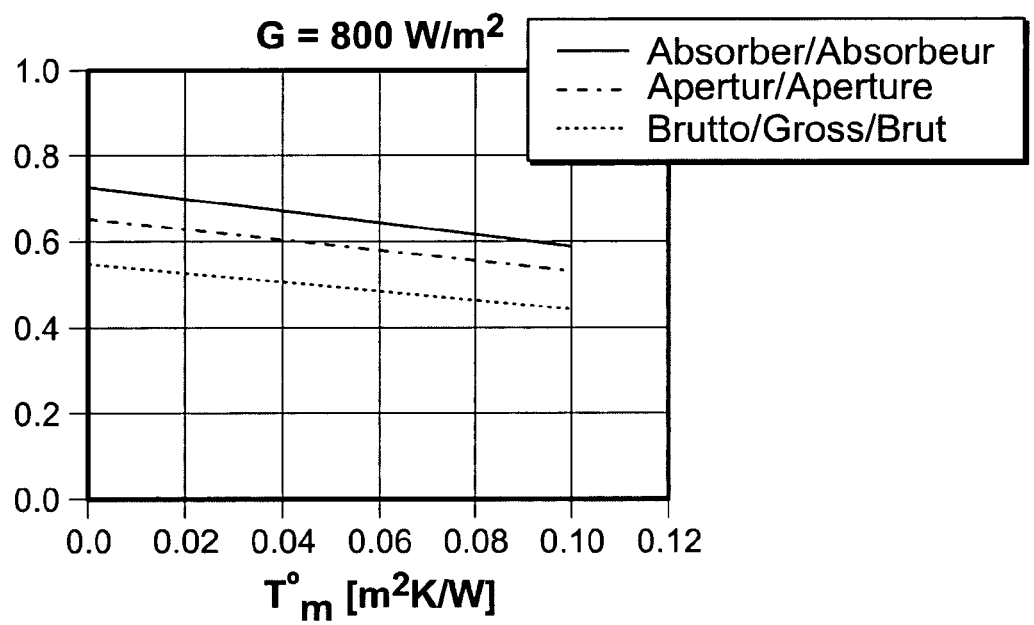
FIG. 11A shows a plot of thermal performance of collector test number C500 with wind.
Figure 11B:
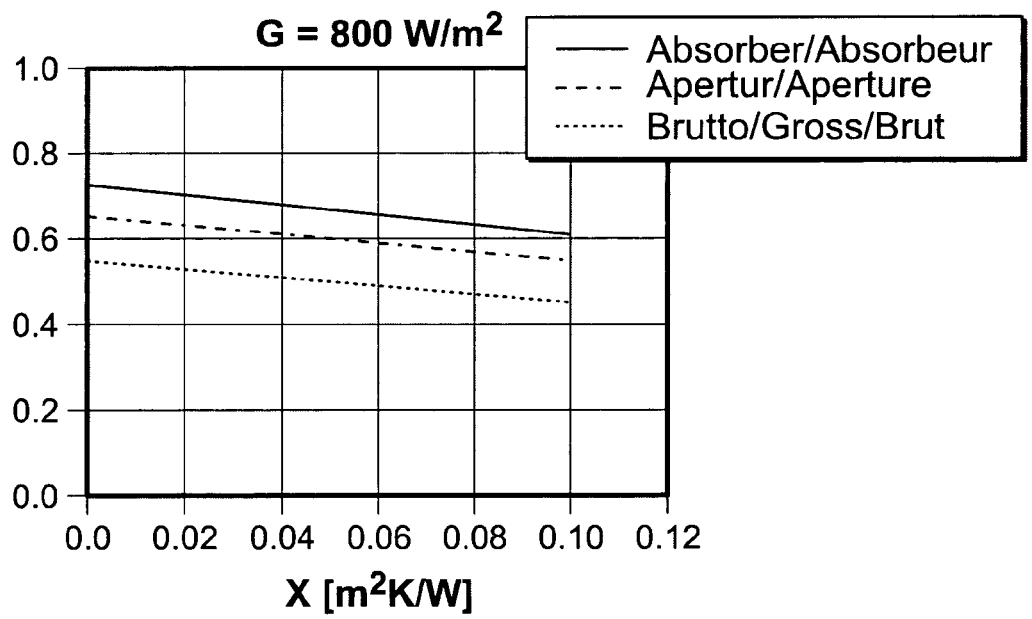
FIG. 11B shows the performance without wind.

Collector Test No. C500. (Consolar GmbH, TUBO 11 CPC) The embodiment of FIG. 7 is described in Table 8 and the tests of Table 9 were performed. There was no stagnation temperature for standard values ISO 9806-2 and EN-12975-2 were 30° C./1000 W/m². The thermal performance (flowrate at test: 100 l/h) is illustrated in FIGS. 11A and 11B, with and without wind, respectively.

TABLE 8

| | |
|---|---|
| Contact | Consolar GmbH, D-60489 Frankfurt/M. Tel. +49 (069) 61 99 11 30, Fax +49 (069) 61 99 11 28 |
| Distributed in* | DE, AT, *EU* |
| Type | ETC, cylindrical absorbers, CPC, direct heat transfer |
| Assembly | |
| Installation* | Installation on sloping roof, Flat roof with support |
| Rated flowrate* | 100 l/h |
| Absorber coating* | Metal carbide |
| Dimensions (absorber, aperture, gross) | 0.873 m², 0.967 m², 1.163 m² |
| Gross dimensions: l, w, h (in m) | 1.860 × 0.625 × 0.045 |
| Weight including glazing* | 13 kg |

*= manufacturer information

TABLE 9

| Test | Carried out | Section | Report* |
|---|---|---|---|
| Durability test according to ISO | No | 3 | LTS C500 |
| Durability test according to EN | No | 3 | C500LPEN |
| Measurement of stagnation temperature | No | 3.1 | |
| Efficiency measurement acc. SPF | Yes | 4.1 | |
| Efficiency measurement acc ISO, DIN, EN | Yes | 4.1 | |
| Incidence angle modifier (IAM) | Yes | 4.4 | |
| Measurement of pressure drop | Yes | 4.5 | |
| Measurement of thermal capacity | No | 4.6 | |
| Measurement of time constant | No | 4.6 | |

*= contact manufacturer for details!

Tables 10A and 10B illustrate characteristic efficiency values (normal incidence, G=800 W/m²) for efficiency with and without wind, respectively. Tables 11A and 11B show power output (power in watts per collector, normal incidence, beam irradiation) with and without wind, respectively.

TABLES 10A and 10B

| Reference area | Absorber | Aperture | Gross | Reference area | Absorber | Aperture | Gross |
|---|---|---|---|---|---|---|---|
| $\eta (T^*_m = 0.00)$ | 0.73 | 0.66 | 0.55 | $\eta (x = 0.00)$ | 0.73 | 0.66 | 0.55 |
| $\eta (T^*_m = 0.05)$ | 0.66 | 0.59 | 0.49 | $\eta (x = 0.05)$ | 0.67 | 0.60 | 0.50 |
| $\eta (T^*_m = 0.10)$ | 0.59 | 0.53 | 0.44 | $\eta (x = 0.10)$ | 0.61 | 0.55 | 0.46 |

TABLES 11A and 11B

| Irradiation | 400 W/m² | 700 W/m² | 1000 W/m² | Irradiation | 400 W/m² | 700 W/m² | 1000 W/m² |
|---|---|---|---|---|---|---|---|
| $t_m - t_e = 10K$ | 241 | 431 | 622 | $t_m - t_e = 10K$ | 244 | 434 | 624 |
| $t_m - t_e = 30K$ | 217 | 407 | 597 | $t_m - t_e = 30K$ | 224 | 414 | 604 |
| $t_m - t_e = 50K$ | 192 | 383 | 573 | $t_m - t_e = 50K$ | 204 | 394 | 584 |

Table 12 shows incidence angle modifier (IAM), and Table 13 shows pressure drop in Pascals (test fluid 33.3% Ethylenglykol).

TABLE 12

| | 0° | 10° | 20° | 30° | 40° | 50° | 60° | 70° | 80° | 90° |
|---|---|---|---|---|---|---|---|---|---|---|
| $K(\Theta)_{,long}$ | 1.0 | | | | | 0.93 | | | | 0.0 |
| $K(\Theta)_{,trans}$ | 1.0 | 1.0 | 1.0 | 0.95 | 0.82 | 0.84 | 0.90 | 1.02 | 1.03 | 0.0 |

TABLE 13

| | 50 l/h | 100 l/h | 150 l/h | 175 l/h | 200 l/h |
|---|---|---|---|---|---|
| 20° C. | 6400 | 13300 | 21400 | 26000 | 30700 |
| 60° C. | | | | | |
| 80° C. | | | | | |

Example III

Figure 12A:
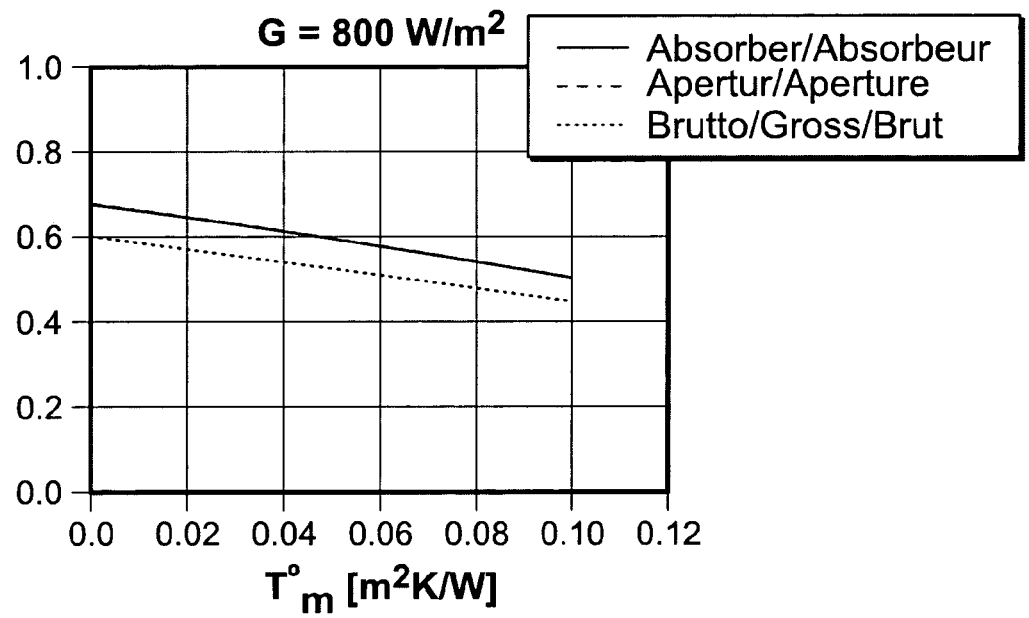
FIG. 12A shows a plot of thermal performance of collector test number C370 with wind.
Figure 12B:
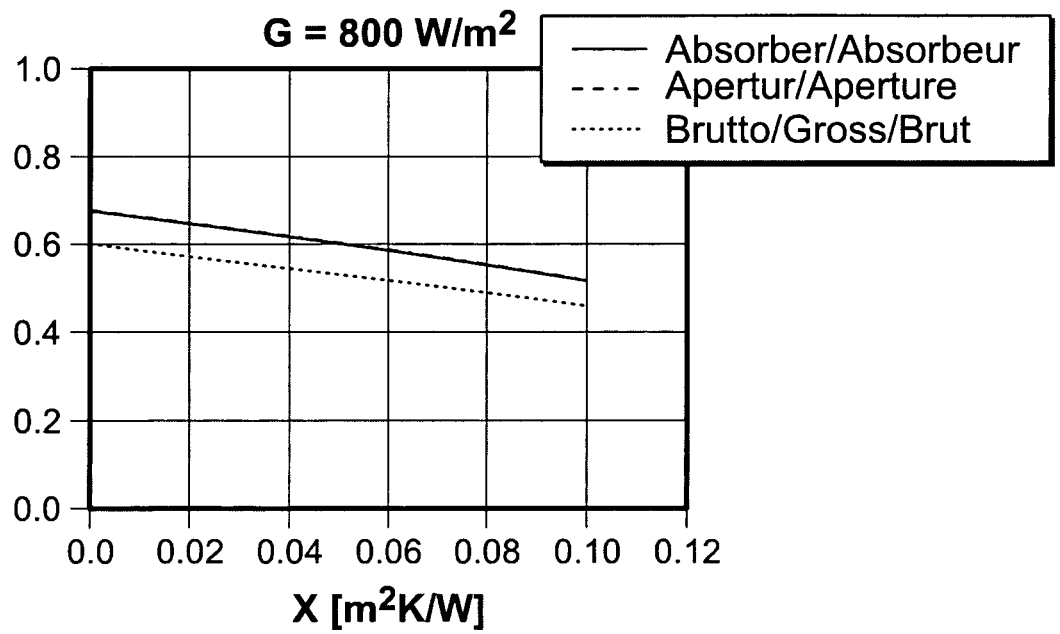
FIG. 12B shows the performance without wind.

Collector Test No. C370. (Paradigma-Schweiz, CPC 14 Star) The embodiment of FIG. 8 is described in Table 14, and the tests of Table 15 were performed. The stagnation temperature for standard values ISO 9806-2 and EN 12975-2 were for 30° C./1000 W/m², 269° C. The collector also passed a durability test. The thermal performance (flowrate at test: 179 l/h) is shown in FIGS. 12A and 12B, with and without wind, respectively.

TABLE 14

| Contact | Paradigma-Schweiz, CH-6201 Sursee Tel. +41 (041) 925 11 22, Fax +41 (041) 925 11 21 |
|---|---|
| Distributed in* | CH, DE, AT, *EU*, PL, HR |
| Type | Evacuated tube collector, cylindrical absorbers, CPC, direct heat transfer |
| Installation* | Installation on sloping roof, Flat roof with support, Facade installation |
| Rated flowrate* | 180 l/h |
| Absorber coating* | Al/Al N |
| Dimensions (absorber, aperture, gross) | 2.332 m², 2.325 m², 2.618 m² |
| Gross dimensions: l, w, h (in m) | 1.613 × 1.623 × 0.120 |
| Weight including glazing* | 42 kg |

*= manufacturer information

TABLE 15

| Test | Carried out | Section | Report* |
|---|---|---|---|
| Durability test according to ISO | Yes | 3 | C370QPISO |
| Durability test according to EN | Yes | 3 | C370QPEN |
| Measurement of stagnation temperature | Yes | 3.1 | C370QPEN |
| Efficiency measurement acc. SPF | Yes | 4.1 | LTS C370 |
| Efficiency measurement acc ISO, DIN, EN | Yes | 4.1 | C370LPEN |
| Incidence angle modifier (IAM) | Yes | 4.4 | |
| Measurement of pressure drop | No | 4.5 | |
| Measurement of thermal capacity | Yes | 4.6 | |
| Measurement of time constant | No | 4.6 | |

*= contact manufacturer for details!

Tables 16A and 16B illustrate characteristic efficiency (normal incidence, G=800 W/m²) for efficiency with and without wind, respectively. Table 17A and 17B show power output (power in watts per collector, normal incidence, beam irradiation) with and without wind, respectively.

TABLES 16A and 16B

| Reference area | Absorber | Aperture | Gross | Reference area | Absorber | Aperture | Gross |
|---|---|---|---|---|---|---|---|
| $\eta (T^*_m = 0.00)$ | 0.68 | 0.68 | 0.60 | $\eta (x = 0.00)$ | 0.68 | 0.68 | 0.60 |
| $\eta (T^*_m = 0.05)$ | 0.59 | 0.60 | 0.53 | $\eta (x = 0.05)$ | 0.60 | 0.60 | 0.54 |
| $\eta (T^*_m = 0.10)$ | 0.50 | 0.51 | 0.45 | $\eta (x = 0.10)$ | 0.52 | 0.52 | 0.46 |

TABLES 17A and 17B

| Irradiation | 400 W/m² | 700 W/m² | 1000 W/m² | Irradiation | 400 W/m² | 700 W/m² | 1000 W/m² |
|---|---|---|---|---|---|---|---|
| $t_m - t_e = 10K$ | 593 | 1'065 | 1'537 | $t_m - t_e = 10K$ | 597 | 1'069 | 1'541 |
| $t_m - t_e = 30K$ | 517 | 989 | 1'461 | $t_m - t_e = 30K$ | 528 | 1'000 | 1'472 |
| $t_m - t_e = 50K$ | 437 | 909 | 1'381 | $t_m - t_e = 50K$ | 455 | 928 | 1'400 |

Table 18 shows incidence angle modifier (IAM).

TABLE 18

|  | 0° | 10° | 20° | 30° | 40° | 50° | 60° | 70° | 80° | 90° |
|---|---|---|---|---|---|---|---|---|---|---|
| $K(\Theta)_{,long}$ | 1.0 |  |  |  |  | 0.90 |  |  |  | 0.0 |
| $K(\Theta)_{,trans}$ | 1.0 | 1.01 | 1.00 | 1.01 | 1.01 | 1.05 | 1.16 |  |  | 0.0 |

What is claimed is:

1. A solar collector, comprising:
   a housing for the solar collector, the housing comprised of an evacuated glass tube;
   a heat pipe disposed within the housing wherein the heat pipe includes a copper pipe and contoured aluminum heat transfer fins and the heat pipe is sandwiched between at least two of the aluminum heat transfer fins; and
   a non-imaging light reflector externally disposed relative to the housing.

2. The solar collector as defined in claim 1 wherein the fins are molded to maximize contact with the heat pipe and the inside surface of the evacuated glass tube.

3. The solar collector as defined in claim 1 wherein the heat pipe and the fins are disposed in a flow-through heat transfer manifold.

4. The solar collector as defined in claim 1 wherein the nonimaging light reflector comprises an external compound parabolic concentrator (XCPC).

5. The solar collector as defined in claim 1 wherein the housing comprises an all glass dewar-type tube.

6. The solar collector as defined in claim 1 wherein the heat pipe includes a hollow center with a vacuum.

7. A method of making a solar collector, comprising the steps of:
   providing a housing for the solar collector;
   positioning a heat pipe inside the housing wherein the heat pipe includes a copper pipe and contoured aluminum heat transfer fins and the heat pipe is sandwiched between two of the aluminum heat transfer fins;
   evacuating the housing; and
   positioning an external compound parabolic concentrator (XCPC) light reflector external to and coupled to the evacuated housing, the XCPC light reflector positioned to illuminate the heat pipe.

8. The method as defined in claim 7 wherein the light reflector comprises a nonimaging reflector.

9. The method as defined in claim 7 wherein the housing comprises a glass tube.

10. The method as defined in claim 7 wherein the fins are shaped to maximize contact with the heat pipe and the inside surface of the evacuated glass tube.

* * * * *